(12) United States Patent
Eshima et al.

(10) Patent No.: US 9,409,606 B2
(45) Date of Patent: Aug. 9, 2016

(54) CABIN FRONT STRUCTURE OF AUTOMOBILE

(71) Applicant: TOYOTA JIDOSHA KABUSHIKI KAISHA, Toyota-shi (JP)

(72) Inventors: Mitsuaki Eshima, Okazaki (JP); Kazuya Tokunaga, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/784,672

(22) PCT Filed: Apr. 10, 2014

(86) PCT No.: PCT/IB2014/000513
§ 371 (c)(1),
(2) Date: Oct. 15, 2015

(87) PCT Pub. No.: WO2014/170732
PCT Pub. Date: Oct. 23, 2014

(65) Prior Publication Data
US 2016/0059900 A1     Mar. 3, 2016

(30) Foreign Application Priority Data

Apr. 19, 2013   (JP) ................................. 2013-088890

(51) Int. Cl.
*B62D 25/14*     (2006.01)
*B60R 21/206*    (2011.01)
*B60R 21/231*    (2011.01)

(52) U.S. Cl.
CPC ............ *B62D 25/145* (2013.01); *B60R 21/206* (2013.01); *B60R 21/231* (2013.01); *B60R 2021/23169* (2013.01)

(58) Field of Classification Search
CPC ............................................. B60R 2021/23169
See application file for complete search history.

(56) References Cited

U.S. PATENT DOCUMENTS 5,564,769 A * 10/1996 Deneau ................ B62D 25/145
                                                                180/90
7,407,221 B2 * 8/2008 Kring ................... B62D 25/145
                                                                296/193.02

(Continued)

FOREIGN PATENT DOCUMENTS

DE    10 2007 032 4        1/2009
DE    10 2011 101 883 A1  11/2011

(Continued)

OTHER PUBLICATIONS

International Search Report Issued Sep. 5, 2014 in PCT/IB14/000513 Filed Apr. 10, 2014.

(Continued)

*Primary Examiner* — Nicole Verley
(74) *Attorney, Agent, or Firm* — Oblon, McClelland, Maier & Neustadt, L.L.P

(57) ABSTRACT

When a front pillar on a driver's seat side is deformed to a vehicle rear side due to short overlap collision on the driver's seat side of an automobile, an instrument panel reinforcement bridged between left and right front pillars is bent at a long hole serving as a starting point and provided on an outer side of a column bracket in a vehicle width direction. Due to this, a steering column, which is mounted on the instrument panel reinforcement through the column bracket, is restrained from being displaced due to a load from the front pillar.

7 Claims, 7 Drawing Sheets

(56) References Cited

U.S. PATENT DOCUMENTS

| | | | | |
|---|---|---|---|---|
| 7,503,622 B2* | 3/2009 | Vican | ................... | B62D 25/145 296/190.03 |
| 8,100,463 B2* | 1/2012 | Penner | ................... | B60K 37/00 296/193.02 |
| 8,444,177 B2* | 5/2013 | Wallat | ................... | B60R 21/206 280/728.3 |
| 8,801,087 B2* | 8/2014 | Kim | ................... | B62D 25/145 296/193.02 |
| 8,950,778 B2* | 2/2015 | Fukushima | .......... | B62D 25/145 280/779 |
| 9,057,114 B2* | 6/2015 | Pellmann | ................ | B62D 21/15 |
| 2009/0026747 A1 | 1/2009 | Schaupensteiner | | |
| 2010/0327627 A1* | 12/2010 | Leanza | ................ | B62D 29/008 296/190.01 |
| 2013/0026798 A1 | 1/2013 | Meier | | |
| 2013/0186230 A1 | 7/2013 | Fujiwara | | |
| 2013/0241235 A1 | 9/2013 | Baudart et al. | | |
| 2013/0249201 A1 | 9/2013 | Fujiwara | | |
| 2015/0056428 A1* | 2/2015 | Birka | ................ | B29C 45/14778 428/209 |
| 2015/0145237 A1* | 5/2015 | Morita | ................ | B60R 21/203 280/779 |
| 2015/0145275 A1* | 5/2015 | Baudard | .............. | B62D 25/145 296/72 |
| 2015/0151793 A1* | 6/2015 | Appasamy | ........... | B62D 25/145 296/72 |
| 2015/0344080 A1* | 12/2015 | Davos | ................. | B62D 29/001 296/205 |

FOREIGN PATENT DOCUMENTS

| | | |
|---|---|---|
| EP | 1 529 720 A1 | 5/2005 |
| EP | 1 762 468 A2 | 3/2007 |
| EP | 2 020 342 A2 | 2/2009 |
| FR | 2 979 886 A1 | 3/2013 |
| JP | 61-51268 U | 4/1986 |
| JP | 2004-189041 A | 7/2004 |
| JP | 2012-76530 A | 4/2012 |
| JP | 2012-76531 A | 4/2012 |
| WO | 2012/070328 A1 | 5/2012 |

OTHER PUBLICATIONS

Japanese Office Action Dated Mar. 31, 2015 in Japanese Application No. 2013-088890 Filed Apr. 19, 2013 (Partial English Translation Only).

* cited by examiner

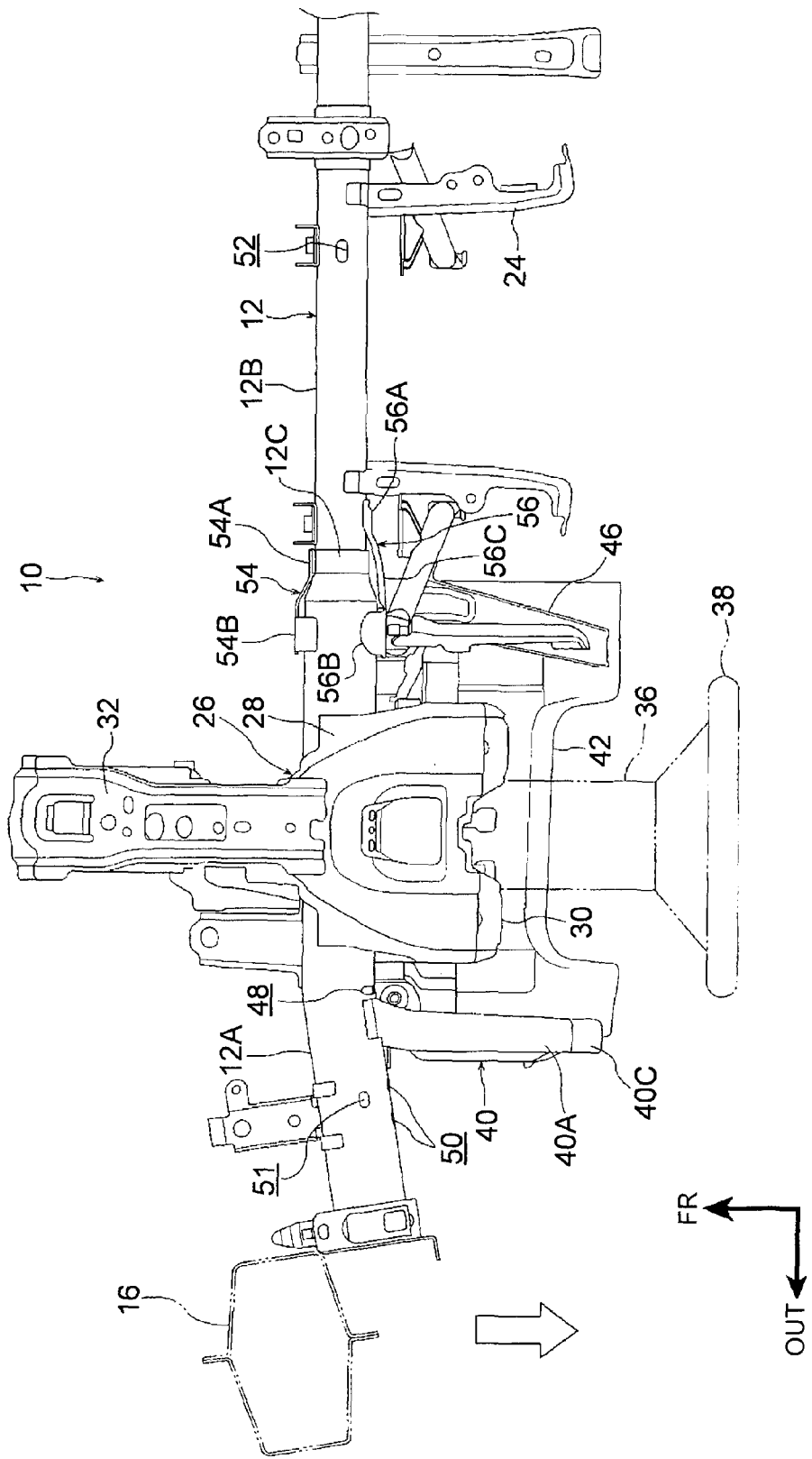

CABIN FRONT STRUCTURE OF AUTOMOBILE

BACKGROUND OF THE INVENTION

1. Field of the Invention

The present invention relates to a cabin front structure of an automobile.

2. Description of Related Art

In the invention described in Japanese Patent Application Publication No. 2012-76531 A (JP 2012-76531 A) below, an instrument panel reinforcement is provided in a front part of a cabin. The instrument panel reinforcement extends in a vehicle width direction and is bridged between left and right body panels (left and right front pillars). A part of the instrument panel reinforcement on a driver's seat side, which requires strength, is formed to be thick, and a part of the instrument panel reinforcement on a passenger seat side, which does not require strength as much, is formed to be thin. On the part of the instrument panel reinforcement on the driver's seat side, a column bracket for mourning a steering column is mounted.

Incidentally, in a collision state where a part of a front part of an automobile has front collision with other vehicle or the like on an outer side of a front side member in a vehicle width direction (so-called short overlap collision), it may be impossible to absorb collision energy by deformation of the front side member. In such a case, a front pillar on the side of the collision is deformed to a vehicle rear side due to a load from a front wheel moving rearward, and it is possible that an instrument panel reinforcement bridged between the left and right front pillars might be bent over at a part where a thickness of the instrument panel reinforcement changes in a middle part of the instrument panel reinforcement in the vehicle width direction.

For example, once the front pillar is deformed to the vehicle rear side due to short overlap collision, a part of the instrument panel reinforcement on the driver's seat side is displaced to the vehicle rear side, and it is thus considered that the instrument panel reinforcement is bent over in the middle part of the instrument panel reinforcement in a vehicle width direction. In this case, a steering column mounted on the instrument panel reinforcement through a column bracket is displaced obliquely to the vehicle rear side and to an inner side in the vehicle width direction about the bent part. It is thus possible that an air bag disposed in a steering wheel may be misaligned from a regular deployment position.

SUMMARY OF THE INVENTION

The present invention obtains a cabin front structure of an automobile, which is able to restrain displacement of a steering column due to a load from a front pillar when short overlap collision happens.

A cabin front structure of an automobile according to an aspect of the invention includes a steering column provided in front of a driver's seat, a column bracket, in which the steering column is mounted on the column bracket, and a front end part of the column bracket is supported by a cowl, and an instrument panel reinforcement bridged between left and right front pillars, in which the column bracket is fixed to the instrument panel reinforcement, and a long fragile part extending in a circumferential direction of the instrument panel reinforcement is provided in the instrument panel reinforcement on an outer side of the column bracket in a vehicle width direction.

In the aspect of the invention, when the front pillar on a driver's seat side is deformed to a vehicle rear side due to short overlap collision on the driver's seat side of the automobile, the instrument panel reinforcement bridged between the left and right front pillars is deformed or broken at the fragile part provided on the outer side of the column bracket in the vehicle width direction (a side of the collision). Thus, the steering column mounted on the instrument panel reinforcement through the column bracket is prevented or restrained from being displaced due to a load from the front pillar. Moreover, the fragile part is formed to be long, and extends in the circumferential direction of the instrument panel reinforcement. Therefore, it is possible to concentrate stress on the fragile part in a favorable manner due to a load from the front pillar.

In the cabin front structure of the automobile, the fragile part may be provided in a rear surface of the instrument panel reinforcement.

When the front pillar on the driver's seat side is deformed to the vehicle rear side by short overlap collision, a compressive load acts on the vertically long fragile part provided in the rear surface of the instrument panel reinforcement. Thus, it is possible to effectively bend the instrument panel reinforcement at the fragile part that serves as a starting point.

In the cabin front structure of the automobile, the fragile part may be a long hole formed in the instrument panel reinforcement.

Since the long hole formed in the instrument panel reinforcement serves as the fragile part, the instrument panel reinforcement provided with the fragile part is easily manufactured.

In the cabin front structure of the automobile, a knee air bag bracket, which supports an outer end part of a knee air bag module in the vehicle width direction, may be fixed to the instrument panel reinforcement on an outer side of the column bracket in the vehicle width direction, an inner end part of the knee air bag module in the vehicle width direction may be supported by a floor brace that is bridged between a floor panel and the instrument panel reinforcement, and the fragile part may be provided between the column bracket and the knee air bag bracket.

The fragile part of the instrument panel reinforcement is provided between the knee air bag bracket supported by the floor brace through the knee air bag module, and the column bracket, the front end part of which is supported by the cowl. Since the fragile part is provided between the highly rigid knee air bag bracket and column bracket, rigidity of the instrument panel reinforcement in normal time is not reduced more than necessary. As a result, the steering column mounted on the instrument panel reinforcement through the column bracket is restrained from vibrating when a vehicle is running. Therefore, it is possible to improve feel of operation of the steering wheel.

In the cabin front structure of the automobile, in the instrument panel reinforcement, a large-diameter part on a driver's seat side and a small-diameter part on a passenger seat side may be connected with each other at a diameter-reduced part provided on the passenger seat side of the column bracket, and the diameter-reduced part may be reinforced by a reinforcement member.

When the front pillar on the driver's seat side is deformed to the vehicle rear side due to short overlap collision, stress concentrates on the diameter-reduced part between the large-diameter part and the small-diameter part of the instrument panel reinforcement. Since the diameter-reduced part is reinforced by the reinforcement member, the instrument panel reinforcement is not deformed or broken at the fragile part.

Thus, the instrument panel reinforcement is effectively prevented from being bent inadvertently at the diameter-reduced part.

A cabin front structure of an automobile includes a steering column provided in front of a driver's seat, a column bracket, in which the steering column is mounted on the column bracket, and a front end part of the column bracket is supported by a cowl, an instrument panel reinforcement bridged between left and right front pillars, in which the column bracket is fixed to the instrument panel reinforcement, and a large-diameter part on a driver's seat side and a small-diameter part on a passenger seat side are connected with each other at a diameter-reduced part provided on the passenger seat side of the column bracket; and a reinforcement member that reinforces the diameter-reduced part.

When the front pillar on the driver's seat side is deformed to the vehicle rear side because short overlap collision happens on the driver's seat side of the automobile, stress concentrates on the diameter-reduced part between the large-diameter part and the small-diameter part of the instrument panel reinforcement that is bridged between the left and right front pillars. This diameter-reduced part is reinforced by the reinforcement member. Therefore, it is possible to prevent the instrument panel reinforcement from being bent at the diameter-reduced part inadvertently. As a result, it is possible to bend the instrument panel reinforcement at a middle part of the small-diameter part in the longitudinal direction, which is provided on the passenger seat side of the diameter-reduced part. In short, it is possible to bend the instrument panel reinforcement further on the passenger seat side. Thus, compared to the case where the instrument panel reinforcement is bent at the diameter-reduced part, a part of the instrument panel reinforcement on the driver's seat side of the bent part has smaller displacement to the inner side in a vehicle width direction when displaced to a vehicle rear side and the inner side in the vehicle width direction about the bent part. Due to this, a steering column mounted on the part of the instrument panel reinforcement on the driver's seat side through a column bracket is restrained from being displaced due to a load from the front pillar.

In the cabin front structure of the automobile, the reinforcement member may include a tensile reinforcement member joined to a front surface of the instrument panel reinforcement, and a compression reinforcement member joined to a rear surface of the instrument panel reinforcement.

When the front pillar on the driver's seat side is deformed to the vehicle rear side due to short overlap collision, a tensile load acting on the front surface side of the instrument panel reinforcement is received by the tensile reinforcement member that is joined to the front surface of the instrument panel reinforcement. At the same time, a compressive load acting on the rear surface side of the instrument panel reinforcement is received by the compression reinforcement member that is joined to a rear surface of the instrument panel reinforcement. Thus, the diameter-reduced part of the instrument panel reinforcement is reinforced effectively.

As explained above, in the cabin front structure of the automobile according to the aspect of the present invention, it is possible to restrain displacement of the steering column due to a load from the front pillar at the time of short overlap collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a plan view corresponding to FIG. 3, showing a state where an instrument panel reinforcement, which is a component member of the cabin front structure, is bent at a long hole serving as a starting point;

DETAILED DESCRIPTION OF EMBODIMENTS

A cabin front structure 10 of an automobile according to an embodiment of the present invention is explained based on FIG. 1 to FIG. 7. An arrow FR, an arrow UP, and an arrow OUT shown as appropriate in each of the drawings indicate a front direction (an advancing direction), an upper direction, an outer side in a vehicle width direction of a vehicle, respectively. In a case where explanation below is given by simply using front-rear, left-right, and upper-lower directions, these directions indicate front and rear in a vehicle front-rear direction, left and right in a vehicle left-right direction (a vehicle width direction), and upper and lower in a vehicle upper-lower direction, respectively, unless otherwise specified.

Figure 1:
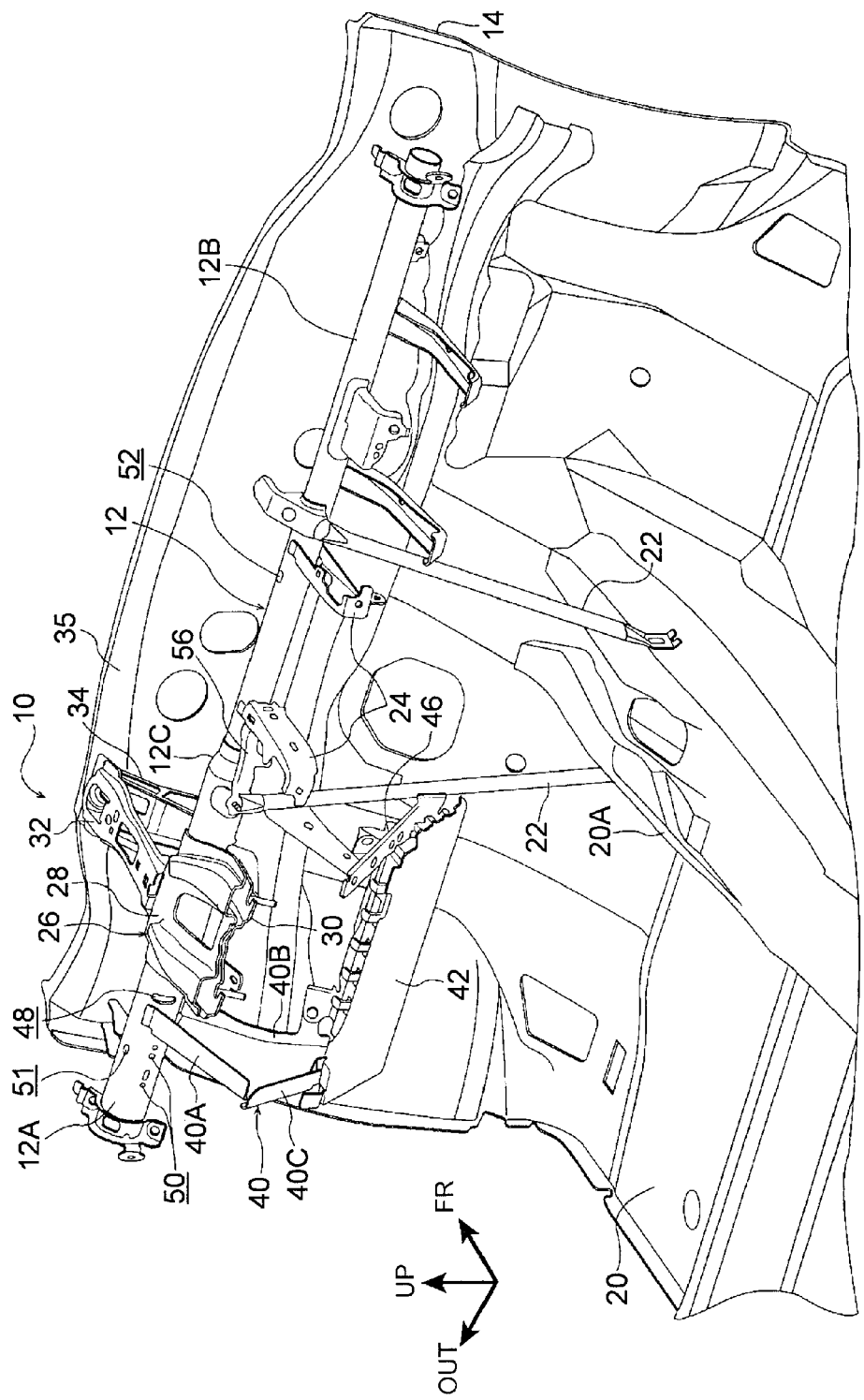
FIG. 1 is a perspective view showing a partial structure of a body of an automobile, to which a cabin front structure of an automobile according to an embodiment of the present invention is applied.
Figure 2:
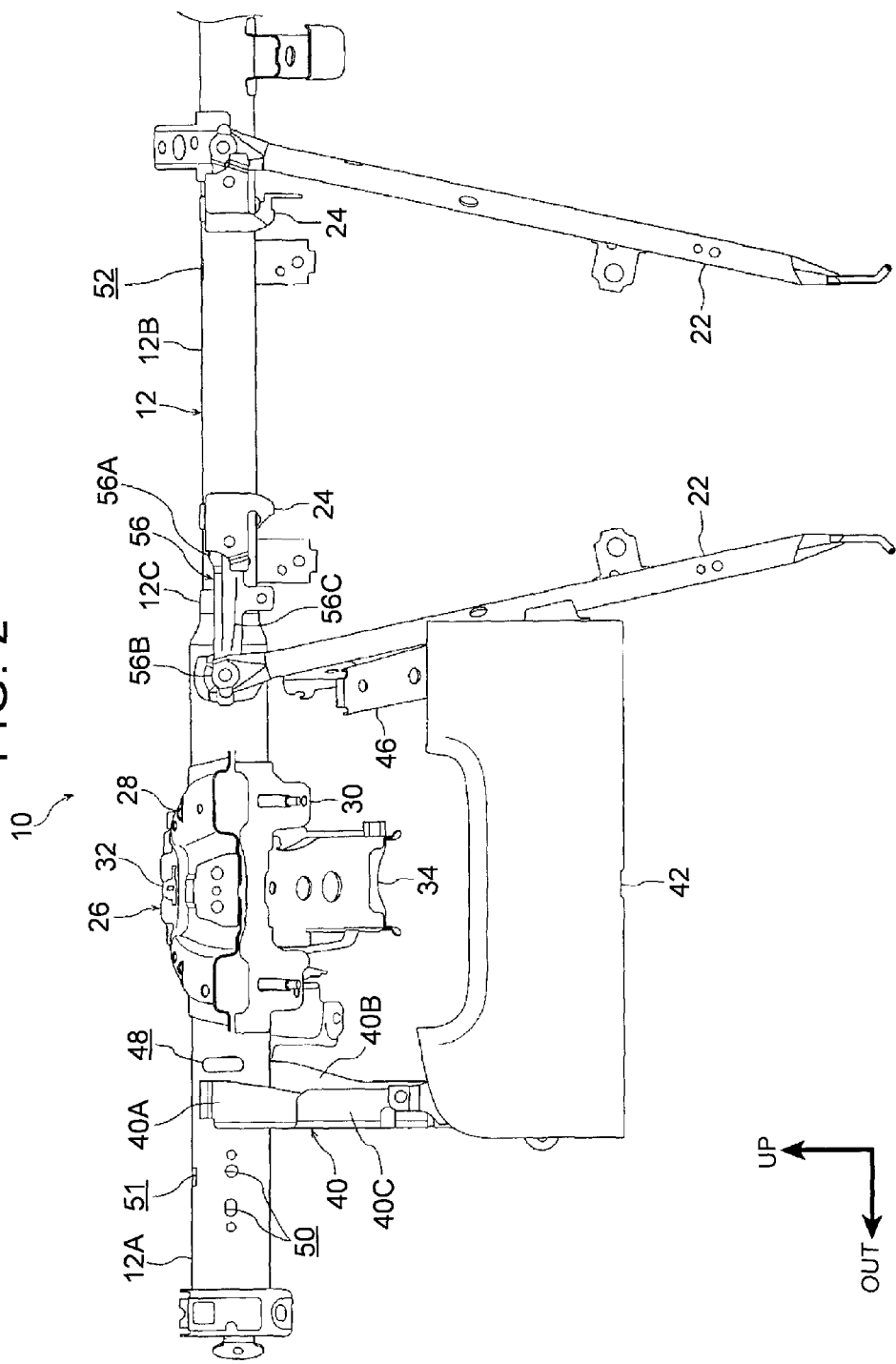
FIG. 2 is a back view of a structure of a main part of the cabin front structure, seen from a rear side of a vehicle.
Figure 3:
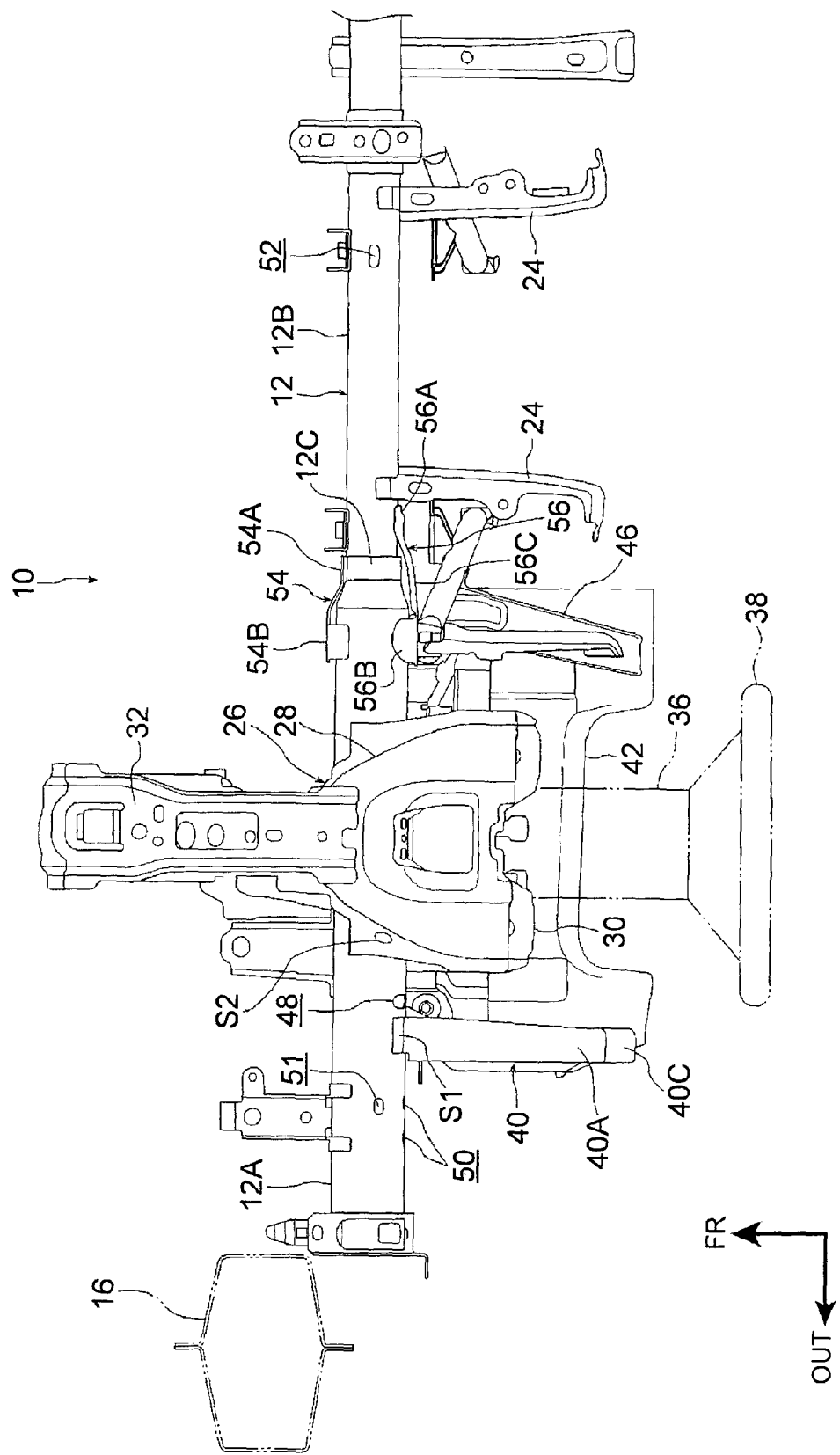
FIG. 3 is a plan view of the structure of the main part of the cabin front structure, seen from an upper side of the vehicle.

(Structure) As shown in FIG. 1 to FIG. 3, the cabin front structure 10 according to this embodiment includes an instrument panel reinforcement 12. The instrument panel reinforcement 12 is formed into a long shape that is longitudinal in a vehicle width direction, and arranged on a vehicle rear side of a dash panel 14 that is provided in front of a cabin. The instrument panel reinforcement 12 is bridged between the left and right front pillars 16 (see FIG. 3), and is fixed to each of the front pillars 16 through a bracket (not shown). In FIG. 3 and FIG. 4, illustration of the front pillar 16 on the right and a right end part of the instrument panel reinforcement 12 is omitted.

The instrument panel reinforcement 12 is structured by a long metallic pipe material. A part of the instrument panel reinforcement 12 on a driver's seat side, which requires strength, is a large-diameter part 12A, and a part of the instrument panel reinforcement 12 on a center side in the vehicle width direction and on a passenger seat side, which does not require so much strength, is a small-diameter part 12B having a diameter smaller than the large-diameter part 12A. The large-diameter part 12A and the small-diameter part 12B are joined to each other by means such as laser welding at a joining part 12C (a diameter-reduced part) located on the driver's seat side of the center in the vehicle width direction.

A pair of left and right floor braces 22 is bridged between a center part of the instrument panel reinforcement 12 in the vehicle width direction, and a floor tunnel part 20A provided in a center part of a floor panel 20 in the vehicle width direction. The left and right floor braces 22 are formed of, for example, a metallic pipe material. Upper ends of the floor braces 22 are fastened and fixed to the instrument panel reinforcement 12 by bolts and nuts, and lower ends of the floor braces 22 are fastened and fixed to the floor tunnel part 20A by bolts and nuts. In the center part of the instrument panel reinforcement 12 in the vehicle width direction, a pair of left and right audio brackets 24 for mounting a car audio (not shown) is fixed between the left and right floor braces 22.

A column bracket 26 (a steering support bracket) is fixed to the large-diameter part 12A of the instrument panel reinforcement 12 in front of a driver's seat (not shown). The column bracket 26 includes an upper bracket 28 and a lower bracket 30, which are press-formed products. Rear part sides of the upper bracket 28 and the lower bracket 30 are superimposed one above the other, and are joined to each other by means such as laser welding. The large-diameter part 12A is sandwiched between a front part of the upper bracket 28 and a front part of the lower bracket 30, and each of the brackets 28, 30 and the large-diameter part 12A are joined to each other by means such as laser welding.

Further, a pair of upper and lower cowl braces 32, 34, which are press-molded products, are provided in the column bracket 26. Rear parts of the upper and lower cowl braces 32, 34 are joined to the brackets 28, 30, respectively, by means such as laser welding. Front end parts of the upper and lower cowl braces 32, 34 are superimposed one on the other, joined to each other by means such as laser welding, and also fastened and fixed to a cowl 35 by a bolt and a nut. The cowl 35 is provided on an upper end part of the dash panel 14.

A steering column 36 is mounted on an lower surface side of the column bracket 26. The steering column 36 includes a steering shaft (not shown) arranged in an axis part of the steering column 36, and a steering wheel 38 for steering a vehicle is mounted on a rear end part of the steering shaft. An air bag module (not shown), which is a component member of an air bag device for the driver's seat, is arranged in a center part of the steering wheel 38. The air bag module is structured so as to inflate and deploy an air bag towards an upper body side of an occupant on the driver's seat when, for example, front collision of the vehicle is detected.

Meanwhile, a knee air bag bracket 40, which is a press-formed product, is fixed to the instrument panel reinforcement 12 on the outer side of the column bracket 26 in the vehicle width direction. The knee air bag bracket 40 is formed into a generally triangle shape in a side view, and is formed so that a dimension of the knee air bag bracket 40 in the upper-lower direction is decreased towards the vehicle front side. Front end parts of upper and lower flange parts 40A, 40B of the knee air bag bracket 40 are joined to the large-diameter part 12A by means such as laser welding.

An end portion of a knee air bag module 42 on the outer side in the vehicle width direction is fastened and fixed to a flange part 40C provided in a rear end part of the column bracket 26 by a bolt and a nut. An end part of the knee air bag module 42 on an inner side in the vehicle width direction is fastened and fixed to a bracket 46 by a bolt and a nut. The bracket 46 is fixed to the floor brace 22 on the left side. The knee air bag module 42 structures a main part of a knee air bag device, and is structured so as to inflate and deploy a knee air bag towards a lower body side of an occupant on the driver's seat when, for example, front collision of the vehicle is detected.

(Main part of this embodiment) In this embodiment, a long hole 48 (an oval opening) that is long and extends in a circumferential direction of the large-diameter part 12A is formed in the large-diameter part 12A of the foregoing instrument panel reinforcement 12 on the outer side of the column bracket 26 in the vehicle width direction. The long hole 48 is formed in a vertically long shape in a rear surface (a surface facing the vehicle rear side) of the instrument panel reinforcement 12 between the column bracket 26 and the knee air bag bracket 40, and passes through a peripheral wall of the instrument panel reinforcement 12.

As shown in FIG. 3, the long hole 48 is formed so that an upper end of the long hole 48 is positioned near an area between a joining spot S1 where the Upper flange part 40A is joined to the large-diameter part 12A (illustration is omitted in the drawings other than FIG. 3), and a joining spot S2 where the upper bracket 28 is joined to the large-diameter-part 12A, the long hole 48 is arranged on a slightly upper side of the center of the instrument panel reinforcement 12 in the upper-lower direction. As shown in FIG. 2 and FIG. 3, the long hole 48 is formed on the knee air bag bracket 40 side (the outer side in the vehicle width direction) of a center part between the column bracket 26 and the knee air bag bracket 40.

In this embodiment, a dimension in the upper-lower direction (a dimension in a longitudinal direction) of the long hole 48 is set to be, for example, about a half of a diameter of the large-diameter part 12A. However, the present invention is not limited to this, and the dimension of the long hole 48 may be changed appropriately depending on a vehicle. As shown in FIG. 1 to FIG. 3, other than the long hole 48 stated above, a plurality of reference holes 50 for positioning, a plurality of fixing holes 51, 52 for fixing wire harnesses, and so on are formed in the instrument panel reinforcement 12. The reference holes 50 and the fixing holes 51, 52 are formed into a circular shape, or an oval shape that is longitudinal in the vehicle width direction.

In this embodiment, a tensile reinforcement member 54 (a front side patch) and a compression reinforcement member 56 (a rear side patch) are provided for reinforcing a joining part 12C of the large-diameter part 12A and the small-diameter part 12B of the instrument panel reinforcement 12. These tensile reinforcement member 54 and the compression reinforcement member 56 are press-molded products, and are formed into a long shape that is longitudinal in the vehicle width direction.

The tensile reinforcement member 54 is arranged on a front surface side of the instrument panel reinforcement 12, and extends from the joining part 12C to the outer side in the vehicle width direction. An inner end part 54A of the tensile reinforcement member 54 in the vehicle width direction (one end part in a longitudinal direction) is curved along an outer peripheral surface of the joining part 12C, and is joined to a front surface of the joining part 12C by means such as laser welding. An outer end part 54B of the tensile reinforcement member 54 in the vehicle width direction (the other end part in the longitudinal direction) is formed so as to have a generally hat-shaped section that is open on the vehicle rear side in a view in the vehicle width direction, and upper and lower flange parts of the outer end part 54B are joined to the front surface of the large-diameter part 12A by means such as laser welding.

The compression reinforcement member 56 is arranged on the rear surface side of the instrument panel reinforcement 12 in a state of crossing over the joining part 12C. An inner side end part 56A of the compression reinforcement member 56 in the vehicle width direction (one end part in the longitudinal direction) is curved along the outer peripheral surface of the small-diameter part 12B, and is joined to a rear surface of the small-diameter part 12B by means such as laser welding. An outer end part 56B of the compression reinforcement member 56 in the vehicle width direction (the other end part in the longitudinal direction) is formed so as to have a generally hat-shaped section that is open on the vehicle front side in a view in the vehicle width direction, and upper and lower flange parts of the outer end part 56B are joined to the rear surface of the large-diameter part 12A by means such as laser welding. The outer end part 56B of the compression reinforcement member 56 in the vehicle width direction is fastened and fixed to the large-diameter part 12A by the bolt and nut that fasten and fix the upper end part of the floor brace 22 to the large-diameter part 12A.

The above-mentioned compression reinforcement member 56 is formed to have a length larger than the length of the tensile reinforcement member 54 in the vehicle width direction, and a middle part of the compression reinforcement member 56 in the vehicle width direction is separated from the instrument panel reinforcement 12 to the vehicle rear side. In the compression reinforcement member 56, a bead 56C is formed, extending along the longitudinal direction of the compression reinforcement member 56, and the bead 56C improves flexural rigidity of the compression reinforcement member 56.

(Actions and effects) Next, actions and effects of this embodiment are explained.

In this embodiment, when the front pillar 16 on the driver's seat side is deformed to the vehicle rear side due to short overlap collision that happens on the driver's seat side of an automobile, a bending load acts on the instrument panel reinforcement 12 that is bridged between the left and right front pillars 16. Because of this, stress is concentrated on an area where the long hole 48 is formed. The long hole 48 is provided in the instrument panel reinforcement 12 on the outer side of the column bracket 26 in the vehicle width direction (a side of the collision). Then, the instrument panel reinforcement 12 is bent at the long hole 48 serving as a starting point (see FIG. 4).

As a result, a part of the instrument panel reinforcement 12 on the outer side of the long hole 48 in the vehicle width direction is displaced to the vehicle rear side together with the front pillar 16, and transmission of a load to an inner part of the instrument panel reinforcement 12 of the long hole 48 in the vehicle width direction is restrained. Due to this, displacement of the steering column 36 mounted on the instrument panel reinforcement 12 through the column bracket 26 is prevented or restrained from being displaced due to a load from the front pillar 16. As a result, the air bag arranged in the steering wheel 38 is prevented from being misaligned from a regular deployment position.

In addition, in this embodiment, since the long hole 48 extends in the circumferential direction of the instrument panel reinforcement 12, it is possible to concentrate stress in the long hole 48 in a favorable manner. Since the long hole 48 serves as a fragile part, it is possible to easily manufacture the instrument panel reinforcement 12 in which the fragile part is provided.

Further, in this embodiment, the long hole 48 is formed into the vertically long shape in the rear surface of the instrument panel reinforcement 12. Therefore, once the front pillar 16 on the driver's seat side is deformed to the vehicle rear side by short overlap collision, a compressive load acts on an area near the long hole 48 that is vertically long. Thus, it is possible to bend the instrument panel reinforcement 12 effectively at the long hole 48 that serves as a starting point. Since the long hole 48 is formed to be closer to the knee air bag bracket 40 than the center part between the column bracket 26 and the knee air bag bracket 40, the knee air bag bracket 40 does not interfere with the column bracket 26 inadvertently when the instrument panel reinforcement 12 is bent at the long hole 48 that serves as a starting point.

In this embodiment, the long hole 48 of the instrument panel reinforcement 12 is formed between the knee air bag bracket 40 supported by the floor brace 22 through the knee air bag module 42, and the column bracket, the front end part of which is fixed to the cowl 35. Since the long hole 48 is formed between the highly rigid knee air bag bracket 40 and column bracket 26, rigidity of the instrument panel reinforcement 12 in normal time is not reduced more than necessary. As a result, the steering column 36 mounted on the instrument panel reinforcement 12 through the column bracket 26 is restrained from vibrating when a vehicle is running. Therefore, it is possible to improve feel of operation of the steering wheel 38.

In particular, the embodiment is structured so that the upper end of the long hole 48 is positioned near the area between the joining spot S1 where the upper flange part 40A of the knee air bag bracket 40 is joined to the large-diameter part 12A, and the joining spot S2 where the upper bracket 28 is joined to the large-diameter part 12A. Therefore, a reduction in rigidity of the instrument panel reinforcement 12 in normal time is restrained effectively.

In this embodiment, the instrument panel reinforcement 12 is structured so that the large-diameter part 12A and the small-diameter part 12B are joined to each other at the joining part 12C. Therefore, when the front pillar 16 on the driver's seat side is deformed to the vehicle rear side due to short overlap collision, stress is concentrated on the joining part 12C. However, the joining part 12C is reinforced by the tensile reinforcement member 54 and the compression reinforcement member 56. Hence, it is possible to prevent the instrument panel reinforcement 12 from bending advertently at the joining part 12C instead of the area where the long hole 48 is formed.

To be specific, when the front pillar 16 on the driver's seat side is deformed to the vehicle rear side, a tensile load acting on the front surface side of the instrument panel reinforcement 12 is received by the tensile reinforcement member 54 that is joined to the front surface of the instrument panel reinforcement 12. At the same time, a compressive load acting on the rear surface side of the instrument panel reinforcement 12 is received by the compression reinforcement member 56 that is joined to the rear surface of the instrument panel reinforcement 12. Thus, the joining part 12C of the instrument panel reinforcement 12 is reinforced effectively.

Moreover, the compression reinforcement member 56, which receives a compressive load, is joined to the rear surface of the instrument panel reinforcement 12 in a state of crossing over the joining part 12C. The middle part of the compression reinforcement member 56 in the vehicle width direction is separated from the instrument panel reinforcement 12 to the vehicle rear side, and the bead 56C is provided in the compression reinforcement member 56 along the longitudinal direction of the compression reinforcement member 56, thus improving flexural rigidity. Thus, the compression reinforcement member 56 is able to work like a tension rod, thereby effectively restraining buckling of the compression reinforcement member 56. Further, the tensile reinforcement member 54 that receives a tensile load is formed to be shorter than the compression reinforcement member 56 in the vehicle width direction. Therefore, the tensile reinforcement member 54 is restrained from stretching advertently due to a tensile load.

Figure 5A:
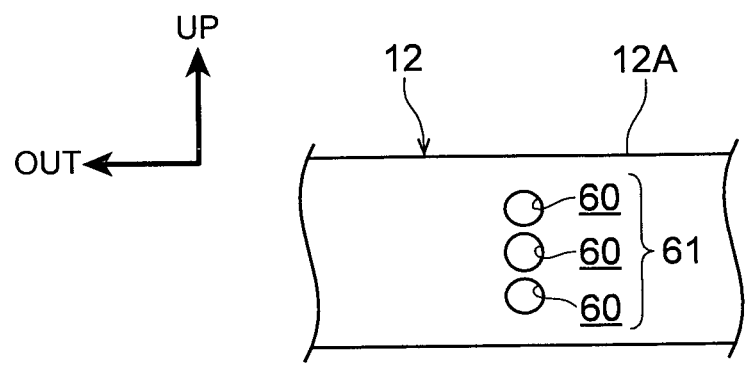
FIG. 5A is a back view of a partial structure of an instrument panel reinforcement according to a first modified example of the embodiment of the present invention, seen from a rear side of a vehicle.
Figure 5B:
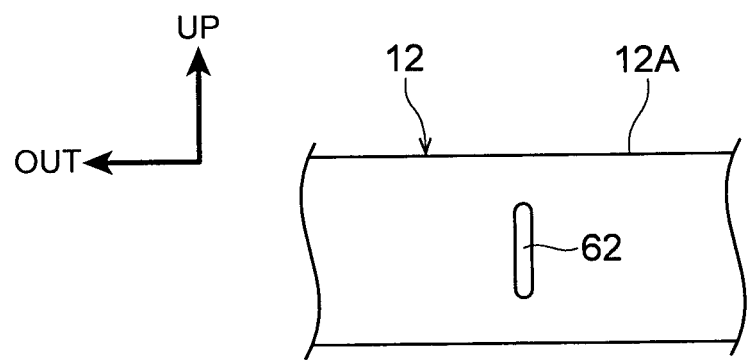
FIG. 5B is a back view of a partial structure of an instrument panel reinforcement according to a second modified example of the embodiment of the present invention, seen from a rear side of a vehicle.
Figure 5C:
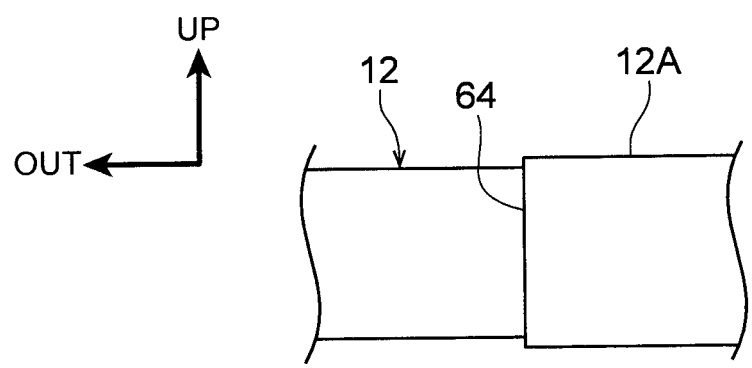
FIG. 5C is a back view of a partial structure of an instrument panel reinforcement according to a third modified example of the embodiment of the present invention, seen from a rear side of a vehicle.
Figure 6A:
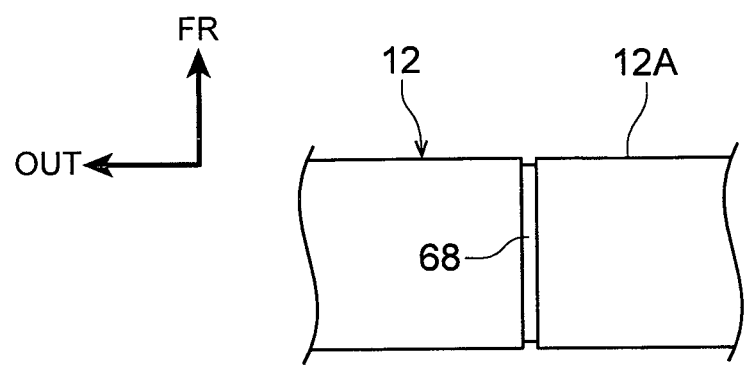
FIG. 6A is a plan view of a partial structure of an instrument panel reinforcement according to a fourth modified example of the embodiment of the present invention, seen from an upper side of a vehicle, and showing a state before a groove part is broken.
Figure 6B:
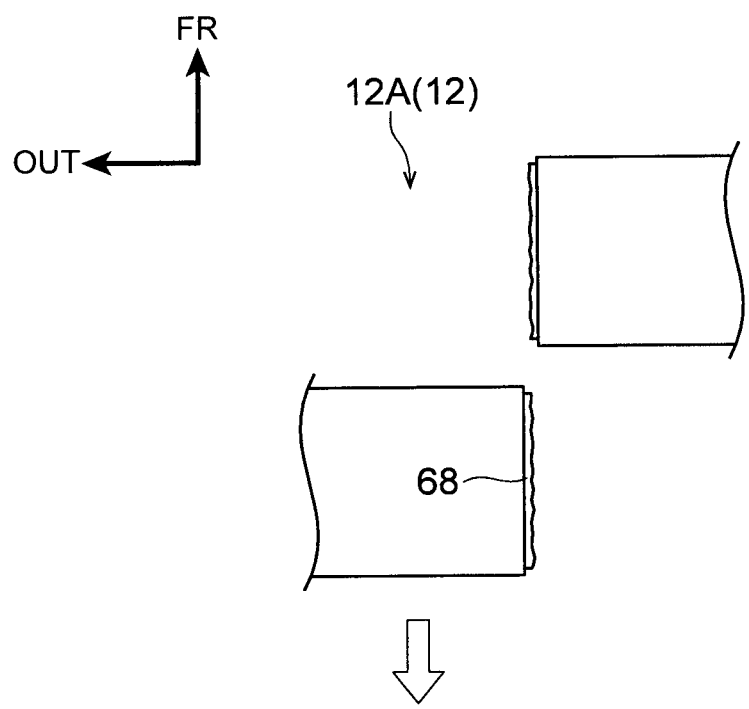
FIG. 6B is the plan view of the partial structure of the instrument panel reinforcement according to the fourth modified example of the embodiment of the present invention, seen from the upper side of the vehicle, and showing a state where the groove part is broken.

<Supplemental explanation of the embodiment> In the foregoing embodiment, the long hole 48 formed in the instrument panel reinforcement 12 serves as the fragile part. However, the present invention is not limited to this, and the structure of the fragile part may be changed as appropriate. For example, as shown in FIG. 5A, a fragile part 61 may be structured by a plurality of circular holes 60 lined up in a circumferential direction of an instrument panel reinforcement 12. Further, for example, as shown in FIG. 5B, a long thin wall part 62, extending in a circumferential direction of a instrument panel reinforcement 12, may be formed in the instrument panel reinforcement 12, and the thin wall part 62 may serve as a fragile part. Furthermore, for example, as shown in FIG. 5C, a step part 64 extending in a circumferential direction of an instrument panel reinforcement 12 may be formed in the instrument panel reinforcement 12, and the step part 64 may serve as a fragile part.

Further, in the foregoing embodiment, when the front pillar 16 on the driver's seat side is deformed to the vehicle rear side, the instrument panel reinforcement 12 is structured to be bent (deformed) at the long hole 48 that serves as a starting point. However, the present invention is not limited to this, the instrument panel reinforcement 12 may be structured to be broken at the fragile part. In other words, for example, a shown in FIG. 6A, a groove part 68 extending in a circumferential direction of an instrument panel reinforcement 12 is formed in all circumference of the instrument panel reinforcement 12, and, when a front pillar 16 is deformed to a vehicle rear side, the instrument panel reinforcement 12 may be broken at the groove part 68 (see FIG. 6B). In this case, it is possible to prevent or restrain displacement of a steering column 36 due to a load from the front pillar 16.

In the foregoing embodiment, the long hole 48 serving as the fragile part is formed in the rear surface of the instrument panel reinforcement 12. However, the present invention is not limited to this, and the fragile part may be formed in the front surface, an upper surface, or a lower surface of the instrument panel reinforcement.

In the foregoing embodiment, the long hole 48 (the fragile part) is provided in the instrument panel reinforcement 12 between the column bracket 26 and the knee air bag bracket 40. However, the present invention is not limited to this, and the fragile part of the instrument panel reinforcement 12 may be provided on the outer side of the knee air bag bracket 40 in the vehicle width direction.

In the foregoing embodiment, the joining part 12C of the instrument panel reinforcement 12 is reinforced by the tensile reinforcement member 54 and the compression reinforcement member 56. However, the present invention is not limited to this, and the structures of the reinforcement members may be changed as appropriate. When strength of the joining part of the instrument panel reinforcement is high, the reinforcement members may be omitted.

In the foregoing embodiment, the instrument panel reinforcement 12 is formed of a pipe material. However, the present invention is not limited to this, and the instrument panel reinforcement may be formed into a quadrangular cylindrical shape. In this case, a direction along an outer periphery of a quadrangular section of the instrument panel reinforcement is regarded as a circumferential direction of the instrument panel reinforcement.

In the foregoing embodiment, the long hole 48 serving as the fragile part is formed in the instrument panel reinforcement 12. However, as shown in FIG. 7, the long hole 48 (the fragile part) may be omitted.

Figure 7:
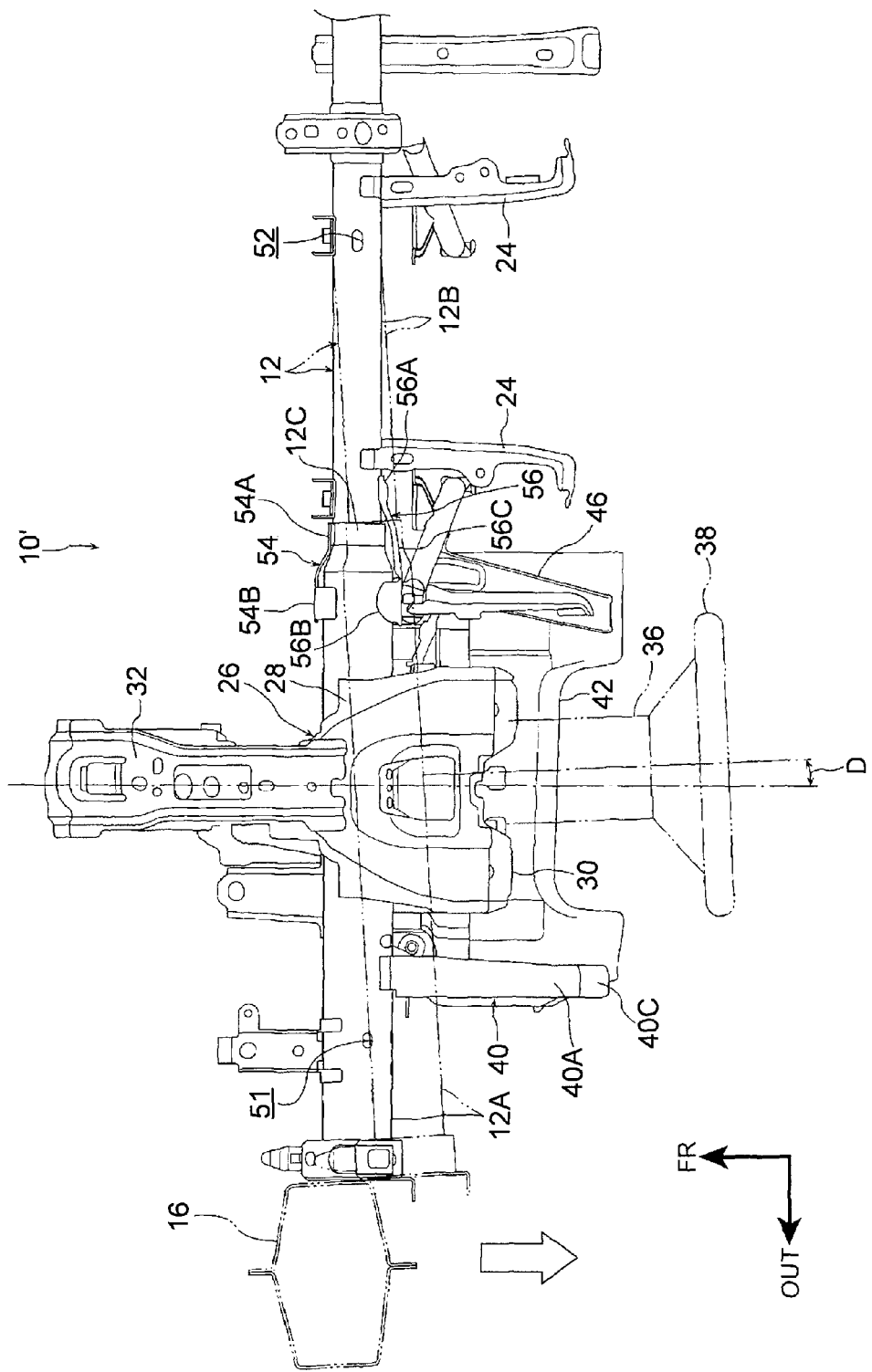
FIG. 7 is a plan view corresponding to FIG. 3, showing a fifth modified example of the embodiment of the present invention.

In a cabin front structure 10' of an automobile shown in FIG. 7, when a front pillar 16 on a driver's seat side is deformed to a vehicle rear side due to short overlap collision on the driver's seat side of the automobile, stress is concentrated on a joining part 12C of an instrument panel reinforcement 12 bridged between left and right front pillars 16. Since the joining part 12C is reinforced by a tensile reinforcement member 54 and a compression reinforcement member 56, it is possible to prevent the instrument panel reinforcement 12 from being bent advertently at the joining part 12C. As a result, the instrument panel reinforcement 12 is allowed to be bent at a middle part of a small-diameter part 12B in a longitudinal direction, which is closer to a passenger seat side than the joining part 12C (for example, near a fixing hole 52 for fixing wire harness) (see the instrument panel reinforcement 12 shown in a chain double-dashed line in FIG. 7).

In short, it is possible to allow the instrument panel reinforcement 12 to be bent further on the passenger seat side. Thus, compared to the case where the instrument panel reinforcement 12 is bent at the joining part 12C, a part of the instrument panel reinforcement 12 on the driver's seat side of the bent part has smaller displacement D to the inner side in a vehicle width direction when displaced to a vehicle rear side and the inner side in the vehicle width direction about the bent part. Due to this, a steering column 36 mounted on the part of the instrument panel reinforcement 12 on the driver's seat side through a column bracket 26 is restrained from being displaced due to a load from a front pillar 16.

In the foregoing embodiment, the large-diameter part 12A and the small-diameter part 12B of the instrument panel reinforcement 12 are joined to each other at the joining part 12C (the diameter-reduced part). However, the present invention is not limited to this, and the large-diameter part and the small-diameter part of the instrument panel reinforcement may be integrally connected to each other at the diameter-reduced part.

The present invention may be carried out with various changes that are made without departing from the gist of the present invention. It is obvious that the scope of rights of the present invention is not limited to the foregoing embodiment.

The invention claimed is:
1. A cabin front structure of an automobile, comprising:
a steering column provided in front of a driver's seat;
a column bracket, in which the steering column is mounted on the column bracket, and a front end part of the column bracket is supported by a cowl; and
an instrument panel reinforcement bridged between left and right front pillars, in which the column bracket is fixed to the instrument panel reinforcement, and a long fragile part extending in a circumferential direction of the instrument panel reinforcement is provided in the instrument panel reinforcement on an outer side of the column bracket in a vehicle width direction, wherein
a knee air bag bracket, which supports an outer end part of a knee air bag module in the vehicle width direction, is fixed to the instrument panel reinforcement on an outer side of the column bracket in the vehicle width direction, an inner end part of the knee air bag module in the vehicle width direction is supported by a floor brace that is bridged between a floor panel and the instrument panel reinforcement, and the fragile part is provided between the column bracket and the knee air bag bracket.

2. The cabin front structure of the automobile according to claim 1, wherein the fragile part is provided in a rear surface of the instrument panel reinforcement.

3. The cabin front structure of the automobile according to claim 1, wherein the fragile part is a long hole formed in the instrument panel reinforcement.

4. The cabin front structure of the automobile according to claim 1, wherein, in the instrument panel reinforcement, a large-diameter part on a driver's seat side and a small-diameter part on a passenger seat side are connected with each other at a diameter-reduced part provided on the passenger seat side of the column bracket, and the diameter-reduced part is reinforced by a reinforcement member.

5. The cabin front structure of the automobile according to claim 4, wherein the reinforcement member includes a tensile reinforcement member joined to a front surface of the instrument panel reinforcement, and a compression reinforcement member joined to a rear surface of the instrument panel reinforcement.

6. A cabin front structure of an automobile, comprising:

a steering column provided in front of a driver's seat;

a column bracket, in which the steering column is mounted on the column bracket, and a front end part of the column bracket is supported by a cowl;

an instrument panel reinforcement bridged between left and right front pillars, in which the column bracket is fixed to the instrument panel reinforcement, and a large-diameter part on a driver's seat side and a small-diameter part on a passenger seat side are connected with each other at a diameter-reduced part provided on the passenger seat side of the column bracket; and a reinforcement member that reinforces the diameter-reduced part, wherein a knee air bag bracket, which supports an outer end part of a knee air bag module in the vehicle width direction, is fixed to the instrument panel reinforcement on an outer side of the column bracket in the vehicle width direction, an inner end part of the knee air bag module in the vehicle width direction is supported by a floor brace that is bridged between a floor panel and the instrument panel reinforcement, and a fragile part is provided between the column bracket and the knee air bag bracket.

7. The cabin front structure of the automobile according to claim 6 the reinforcement member includes a tensile reinforcement member joined to a front surface of the instrument panel reinforcement, and a compression reinforcement member joined to a rear surface of the instrument panel reinforcement.

* * * * *